No. 793,397. PATENTED JUNE 27, 1905.
H. A. SCHERMERHORN.
FASTENING FOR WAGON END GATES.
APPLICATION FILED DEC. 10, 1904.
2 SHEETS—SHEET 2.
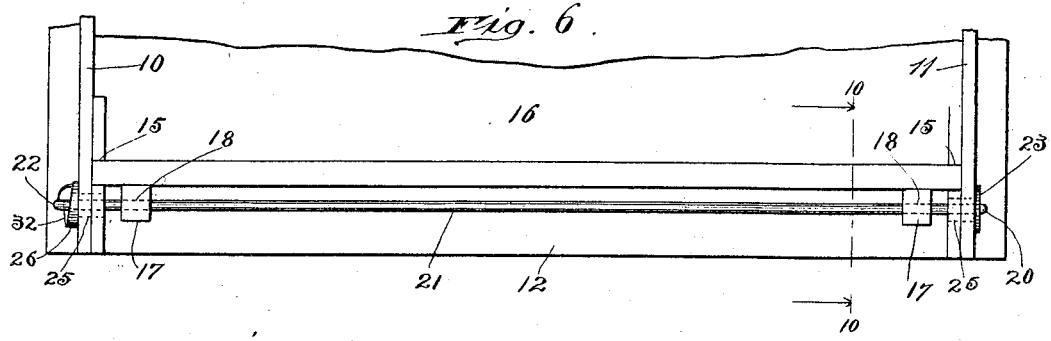
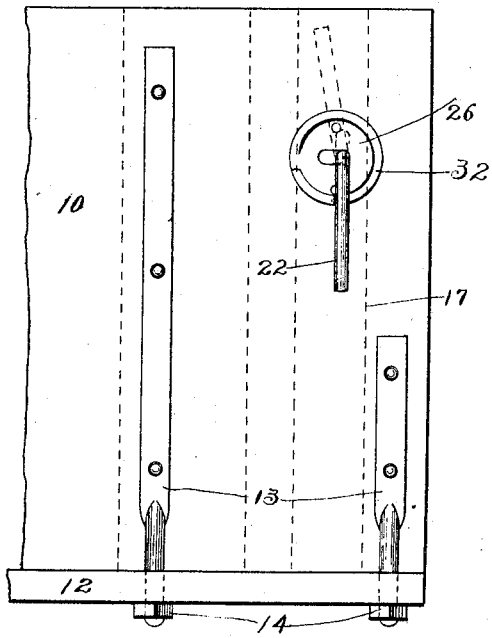
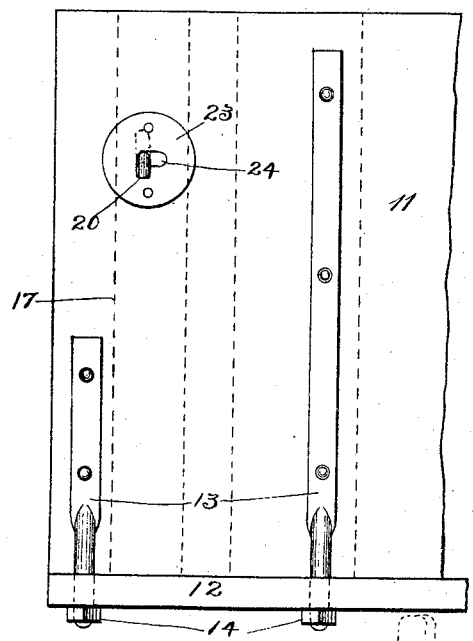
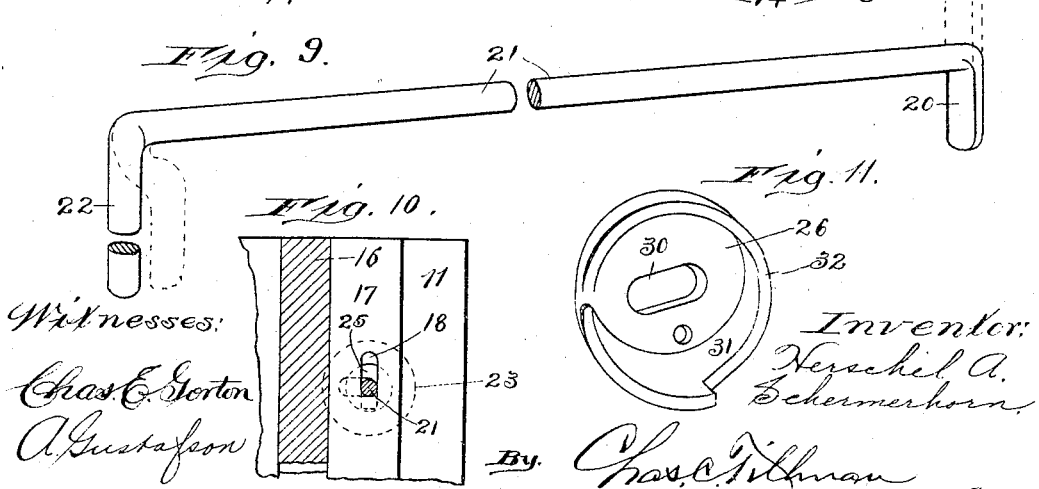
Witnesses:
Chas. E. Gorton
A. Gustafson
Inventor:
Herschel A. Schermerhorn,
By Chas. C. Tillman
Atty.

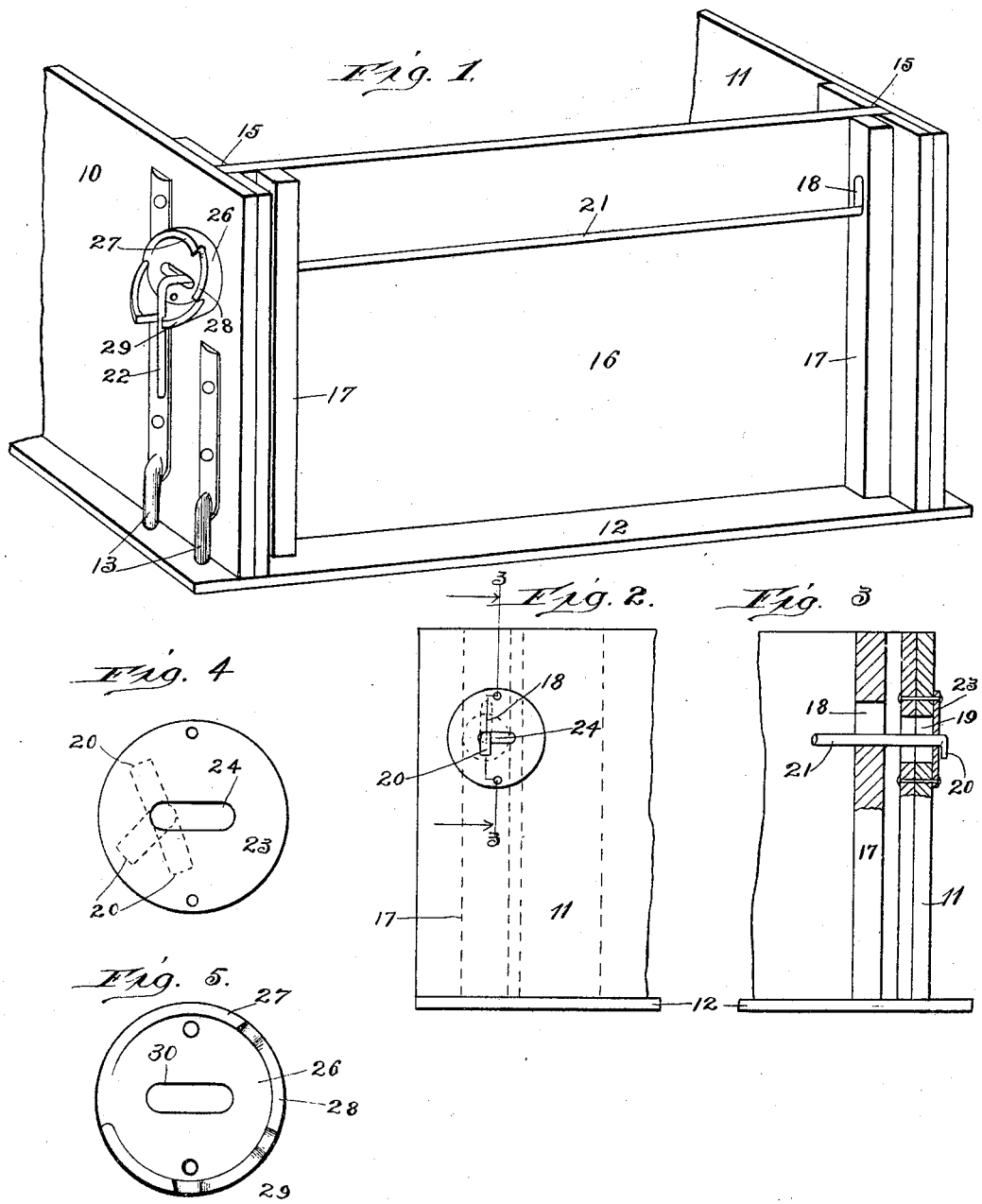

No. 793,397.

Patented June 27, 1905.

UNITED STATES PATENT OFFICE.

HERSCHEL A. SCHERMERHORN, OF SHABBONA, ILLINOIS.

FASTENING FOR WAGON END-GATES.

SPECIFICATION forming part of Letters Patent No. 793,397, dated June 27, 1905.

Application filed December 10, 1904. Serial No. 236,306.

*To all whom it may concern:*

Be it known that I, HERSCHEL A. SCHERMERHORN, a citizen of the United States, residing at Shabbona, in the county of Dekalb and State of Illinois, have invented certain new and useful Improvements in Fastenings for Wagon End-Gates, of which the following is a specification.

My present invention relates to improvements in fastenings for wagon end-gates; and the objects thereof are substantially the same as set forth in Letters Patent No. 732,965, issued to me on the 7th day of July, 1903—namely, to provide means for fastening the end-gates of wagons which shall be much cheaper in construction, of fewer parts, and simpler in operation than the device described in my aforesaid patent, as well as efficient and satisfactory in use, and which shall be so made that the ordinary rods with nuts on the ends employed for connecting the sides of the wagon-body together and for holding the end-gates in place, which rods often become useless by reason of the loss of nuts used thereon or the screw-threads being worn or stripped off, may be dispensed with.

A further object of the invention is to afford a fastening which shall be positive in its engagement and so made that tie-rods of different lengths may be used for connecting the sides of the body in such a manner as to firmly hold the end-gate in place and so as to prevent rattling thereof and noise.

Other objects and advantages of the invention will be disclosed in the subjoined description and explanation.

In order to enable others skilled in the art to which my invention pertains to make and use the same, I will now proceed to describe it, referring to the accompanying drawings, in which—

Figure 1 is a perspective view of the rear portion of a wagon-body, showing an end-gate secured in place thereon by means of one form of my invention. Fig. 2 is a view in side elevation of a portion of one side of the box or body. Fig. 3 is a view, partly in section and partly in elevation, taken on line 3 3 of Fig. 2 looking in the direction indicated by the arrows. Fig. 4 is a detached face view of the bearing-plate for one end of the cranked tie-rod, showing by dotted lines the positions which the crank on said rod may assume. Fig. 5 is a detached face view of the cam-plate used at the opposite end of the tie-rod. Fig. 6 is a plan view of the rear portion of a wagon-body, showing an end-gate secured in place thereon by means of a modified form in the construction of my invention. Fig. 7 is a view in side elevation of a portion of the side of the body on which the cam-plate is mounted. Fig. 8 is a similar view of a portion of the opposite side of the body. Fig. 9 is a perspective view of the cranked rod, showing it shortened for the convenience of illustration and illustrating by dotted lines the positions to which the cranks may be bent. Fig. 10 is a view, partly in section and partly in elevation, taken on line 10 10 of Fig. 6 looking in the direction indicated by the arrows; and Fig. 11 is a detached perspective view of the cam-plate, showing a modification therein.

Like numerals of reference refer to corresponding parts throughout the different views of the drawings.

The reference-numerals 10 and 11 indicate the sides of the wagon-body, which may be secured to the bottom 12 thereof by means of clips 13, which pass through the bottom and have on their lower ends nuts 14, as usual. Each of the sides is provided on its inner surface near its rear end with a vertical groove 15 to receive the ends of the end-gate 16, which is provided near each of its ends, and preferably on its outer surface, with transverse cleats 17, each of which is provided near its upper end with an opening 18, which is elongated and extends therethrough and longitudinally therewith. The side 11 of the body is provided at a point therein to register with the opening 18 in one of the cleats on the end-gate, with an opening 19 sufficiently large to permit of the crank 20 on one end of the tie-rod 21, which connects the sides 10 and 11 together, to pass. The outer surface of the side 11 has secured thereon a bearing-plate 23, which is provided with a horizontally-disposed opening 24, the lower edge of which when the plate 23 is secured in place on the side 11 of the wagon-body will lie in a horizontal line with the lower edge of the opening 18 in the cleat 17 adjacent to said side of the body. The opening 24 is of sufficient width and length to permit of the passage of the end of the tie-rod 21 and the crank 20 thereon, yet of a size to fit the rod snugly inwardly from said crank. The side 10 of the wagon-body is provided with an opening 25 therein at a point to register with the opening 18 in the cleat 17 adjacent thereto, which opening is also sufficient in size to permit of the passage of the crank 20 on one end of the tie-rod. Secured to the outer surface of the side 10 over the opening 25 therein is a stepped or graduated cam-plate 26—that is, a plate which has on its outer face an annular flange provided with a series of cams 27, 28, and 29, arranged in steps or graduated with respect to one another, so that the cam 28 will be wider than the cam 27 and the cam 29 will be wider than the cam 28, as is clearly shown in Fig. 1 of the drawings. The plate 26 has therein an elongated opening 30, which when said plate is secured in place on the side 10 of the body will lie horizontally or at right angles to the elongated opening 18 in the cleat 17 adjacent to said side. The end of the tie-rod 21 opposite that which is provided with the crank 20 is formed or provided with a crank-handle 22, used for turning said rod.

In Figs. 6, 7, and 11 of the drawings I have shown a modification in the construction of the cam-plate 26, which consists in providing it with an annular flange 31, having on its free edge a single cam 32 instead of a series of cams, as in the other construction. When this modified form of the cam-plate is employed, the other parts of the fastening are constructed as above set forth.

From the foregoing and by reference to the drawings it will be clearly seen and readily understood that ordinarily the crank 20 and crank-handle 22 on the ends of the tie-rod 21 will be bent in the same direction, as shown in full lines in Fig. 9 of the drawings; but under some circumstances they may be bent or arranged in opposite directions from each other, as illustrated by dotted lines in said figure. By presenting the crank 20 horizontally to the opening 30 in the cam-plate it is apparent that it may be passed through said opening, when by turning the rod 21 so that the crank 20 will assume a vertical position it may be passed through the openings 18 in the cleats 17, after which the rod 21 may again be turned so that the crank 20 will lie horizontally, when it may be passed through the horizontal opening 24 in the plate 23, which is employed to engage the crank 20 and to prevent it wearing the side 11 of the body. After thus having been passed through said openings it is apparent that the rod 21 may be turned so that the crank 20 will project at an angle to the opening 24 in the plate 23, thus preventing the withdrawal of the rod. As the opposite end of the rod 21 is provided with the crank-handle 22, it is apparent that it will coact with the cams 27, 28, and 29 on the cam-plate 26 in such a way as to draw the sides of the body together and against the ends of the end-gate, thereby firmly securing it against longitudinal movement. The end-gate will be held against vertical and lateral movement by means of the rod 21, which passes through the openings 18 in the cleats 17 thereon, and it is apparent that the grooves 15 in the sides of the body will further aid in preventing any lateral movement of the end-gate. By employing the plate with the stepped or graduated cams thereon it is apparent that if a short tie-rod is employed the crank-handle 22 will act on the narrow cam 27 only; but if a longer rod is used the crank-handle thereon will coact with one of the wider cams 28 and 29, so as to draw the sides of the body together. In some instances, where the cam-plate with a single cam, as shown in Figs. 6, 7, and 11, is employed, if the cranks of the rod 21 become worn or the rod is slightly too long to draw the sides of the body tightly against the ends of the end-gate the crank-handle 22 may be bent inwardly by any suitable means, as shown by dotted lines in Fig. 9 of the drawings.

Having thus fully described my invention, what I claim as new, and desire to secure by Letters Patent, is—

1. In a fastening for wagon end-gates, the combination with the sides of the body each provided with an opening near its rear end, of a plate secured to the outer surface of one of the sides over the opening therein and having on its outer face an upright cam, an end-gate located between said sides, and a tie-rod having a crank at each of its ends, substantially as described.

2. In a fastening for wagon end-gates, the combination with the sides of the body each provided with an opening near its rear end, of a bearing-plate secured to the outer surface of one of said sides over the opening therein and having an elongated opening, a cam-plate provided with an upright cam and secured to the outer surface of the other side over the opening therein and having an elongated opening, an end-gate located between the said sides, and a tie-rod having a crank at one of its ends to engage the bearing-plate and at its other end a crank-handle to engage the cam of the cam-plate, whereby the sides will be drawn toward each other, substantially as described.

3. In a fastening for wagon end-gates, the combination with the sides of the body each provided with an opening near its rear end, of an end-gate located therebetween, a plate secured to the outer surface of one of the sides over the opening therein and having an elongated opening and on its outer face an upright cam, and a tie-rod located in said openings and having a crank on each of its ends, substantially as described.

4. In a fastening for wagon end-gates, the combination with the sides of the body each provided near its rear end with a vertical groove and an opening, of an end-gate located therebetween with its ends in said grooves, a cleat secured transversely on the end-gate near each of its ends and having an opening, a plate secured to the outer surface of one of the sides over the opening therein and having an elongated opening and on its outer face an upright cam, and a tie-rod located in said openings and having a crank on each of its ends, substantially as described.

5. In a fastening for wagon end-gates, the combination with the sides of the body each provided with an opening near its rear end, of an end-gate located therebetween, a cleat transversely secured on the end-gate near each of its ends and having an opening, a bearing-plate secured to the outer surface of one of the sides over the opening therein and having an elongated opening, a cam-plate provided on its outer face with an upright cam and secured to the outer surface of the other side over the opening therein and having an elongated opening, and a tie-rod located in said openings and having a crank on each of its ends, substantially as described.

6. In a fastening for wagon end-gates, the combination with the sides of the body each provided with an opening near its rear end, of an end-gate located therebetween, a plate secured to the outer surface of one of the sides over the opening therein and having an opening and on its outer face a series of stepped cams, and a tie-rod located in said openings and having a crank on each of its ends, substantially as described.

7. In a fastening for wagon end-gates, the combination with the sides of the body each provided near its rear end with a vertical groove and an opening, of an end-gate located between said sides with its ends in said grooves, an apertured cleat transversely secured to the end-gate near each of its ends, a plate secured to the outer surface of one of the sides over the opening therein and having an opening and on its outer face a series of stepped cams, and a tie-rod located in said openings and having a crank on each of its ends, substantially as described.

8. In a fastening for wagon end-gates, the combination with the sides of the body each provided near its rear end with a vertical groove and an opening, of an end-gate located between the sides with its ends in said grooves, a cleat transversely secured on the end-gate near each of its ends and having a vertically-elongated opening, a bearing-plate secured to the outer surface of one of the sides over the opening therein and having a horizontally-elongated opening, a cam-plate provided with an upright cam and secured to the outer surface of the other side over the opening therein and having a horizontally-elongated opening, and a tie-rod having a crank at one of its ends to engage the bearing-plate and at its other end a crank-handle to engage the cam of the cam-plate, whereby the sides will be drawn toward each other, substantially as described.

HERSCHEL A. SCHERMERHORN.

Witnesses:
CHAS. C. TILLMAN,
A. GUSTAFSON.